Sept. 9, 1969  E. V. VON GOHREN  3,465,985
APPARATUS FOR MOUNTING A ROCKETSONDE THERMISTOR
Filed Oct. 5, 1967

INVENTOR.
EDWARD V. VONGOHREN
BY
George Line,
ATTORNEY

United States Patent Office 3,465,985
Patented Sept. 9, 1969

3,465,985
APPARATUS FOR MOUNTING A ROCKETSONDE THERMISTOR
Edward V. von Gohren, Bowie, Md.
(Hg. AWS, Scott Air Force Base, Ill. 62225)
Filed Oct. 5, 1967, Ser. No. 673,231
Int. Cl. B64g 1/00; H04b 1/02
U.S. Cl. 244—1                    4 Claims

ABSTRACT OF THE DISCLOSURE

Thermistor mounting apparatus to be integrated with a rocketsonde in the form of a helmet or bonnet carrying a conventional thermistor type of sensor at the apex of the bonnet. Electrical connection to the telemetry transmitter of the rocketsonde is in the form of a pair of aluminum strips extending from the apex, or "pole," of the bonnet to points on the bonnet's base.

---

This invention relates to thermistor apparatus integrated with a meteorological rocketsonde, and more particularly apparatus to mount a thermistor associated with a meteorological rocketsonde wherein the aspect of the thermistor remains substantially independent of the motions of the rocketsonde when descending through the atmosphere.

In accordance with the present invention, there is provided a thermistor mount for meteorological rocketsondes for use on such systems as the PWN–6A and PWN–8A. The mount is a geometric surface of revolution constructed from a thin film of Mylar. The shape of the mount may take the form of a paraboloid, hemisphere on a cylinder, or any shape which approximates or is intermediate to these shapes. The interior surface of the Mylar is coated with a thin layer of aluminum. The exterior surface contains two coated aluminum conducting strips which run from near the edge to near the apex. A normal bead thermistor is affixed to this device in the conventional manner by soldering the thermistor leads to the conducting strips at the apex of the shape. The electrical circuit to the sonde (telemetry transmitter unit) is closed by soldering the appropriate leads to the aft end of the appropriate conducting strip. The invention may be connected to the sensor mounting plate by several methods, the preferred being tab and slot with epoxy bonding. Ventilation between the interior of the mount and the outside atmosphere is provided by spaces left between the aft end of the mount and the sensor mounting plate.

One of the features of this invention is the use of a shape based on a geometric surface of revolution to mount the bead thermistor on the sonde (telemetry transmitter unit). This is a novel approach to solving the problem of the aspect sensitivity of present day flat plate thin-film mounts.

This invention significantly reduces the uncertainties of heat transfer effects between the bead thermistor mount and the environment. This in turn leads to reduced uncertainties in heat transfer between the bead thermistor and the mount. This invention effectively normalizes the long and short wave radiation balance between the thermistor mount and the environment, including earth, sun, and space. This is done by presenting a similar aspect to the earth, sun, and space; substantially independent of the motions of the instrument when descending through the atmosphere. Small changes in the angle of attack between the axis of the instrument and the mount, and the relative wind will not significantly change the boundary layer around the mount. This solves a problem with present mounting arrangements in that present mounts are aspect sensitive to radiation sources and sinks and to the relative wind. The end result is the increased accuracy of corrections for temperature measurements of the environment between 20 and 70 kms. altitude.

An object of the present invention is to provide thermistor mounting apparatus associated with a meteorological rocketsonde wherein the aspect of the thermistor remains substantially independent of the motions of the rocketsonde when descending through the atmosphere.

Another object of the present invention is to provide thermistor mounting apparatus associated with a meteorological rocketsonde wherein the long and short wave radiation balance between the thermistor mount and environment is normalized.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

Figure 1:
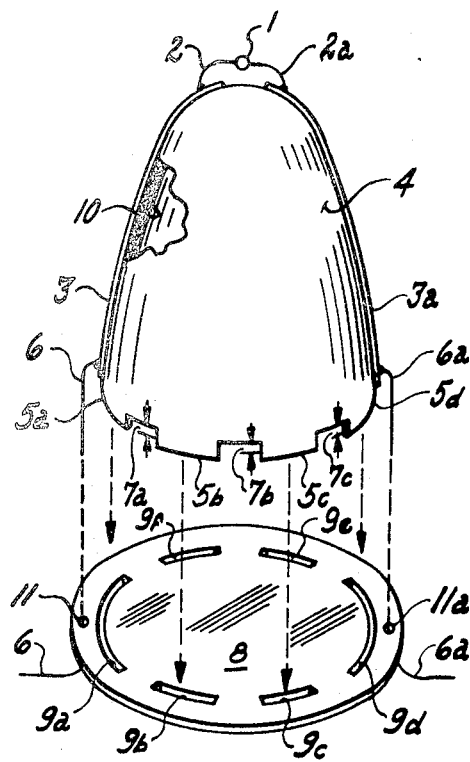
FIGURE 1 illustrates one embodiment of the present invention in which the thermistor mounting apparatus is shown in the form of a paraboloid.

Now referring in detail to FIGURE 1, there is shown a thermistor mounting apparatus for rocketsondes for use on such systems as the PWN–6A and PWN–8A. Mount or bonnet 4 is a geometric surface of revolution constructed of a thin 1 mil film of Mylar in the shape of a paraboloid. The shape of the mount may also take the form of a hemisphere, hemisphere on a cylinder or any shape which approximates or is intermediate to these shapes. The interior surface of Mylar mount 4 is coated with thin aluminum layer 10 by any of the conventional means. The exterior surface of Mylar mount 4 contains two coated aluminum strips 3 and 3a which run from near the edge to near the apex. Conventional 10 mil bead thermistor 1 is affixed to mount 4 by soldering thermistor leads 2 and 2a to conducting aluminum strips 3 and 3a, respectively, at the aforementioned apex. Lead wires 6 and 6a are soldered to aluminum strips 3 and 3a, respectively.

Sensor mounting plate 8 is provided which is positioned in the conventional manner at the rocketsonde. Mount 4 may be connected to the sensor mounting plate by several methods, the preferred being the tab and slot method with epoxy bonding. Mount 4 is shown with tabs 5a–5f; sensor mounting plate 8 is shown with slots 9a–9f. Tabs 5a–5f are epoxy bonded in slots 9a–9f, respectively. Ventilation between the interior of mount 4 and the outside atmosphere is provided by spaces 7a–7f left between the aft end of mount 4 and sensor mounting plate 8. The dimensions of mount 4 and sensor mounting plate 8 are scaled to fit PWN–6A and PWN–8 meteorological rocketsonde systems.

It is to be noted that the electrical circuit connection to the sonde (telemetry transmitter unit of the rocketsonde) from thermistor 1 is made by bringing lead wires 6 and 6a through holes 11 and 11a, respectively.

In the operation of the embodiment shown in FIGURE 1, the interior surface has been aluminized thus reflecting radiation from the thermistor mounting apparatus. In addition thereto ventilation between the interior of mount 4 and the atmosphere has been provided. By using a predetermined geometric surface of revolution to mount thermistor bead 1 the aspect sensitivity is substantially eliminated. It is to be especially noted that in operation of this invention the long and short wave radiation balance between the thermistor mount 4 and the environment, including earth, sun and space, is normalized. This is done by presenting a similar aspect to the earth, sun, and space substantailly independent of the motions of the rocketsonde when descending through the atmosphere. Small changes in the angle of attack between the axis of rocketsonde and the mount, and the relative wind will not significantly change the boundary layer around the mount.

Figure 2:
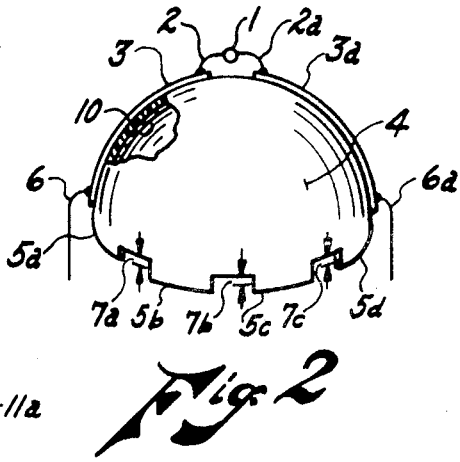
FIGURE 2 shows a second embodiment of the present invention in a hemisphere on cylinder form.

Now referring to FIGURE 2, there is shown mount 4 which is identical to mount 4 of FIGURE 1 with the exception mount 4 of FIGURE 1 is in the paraboloid style and mount 4 of FIGURE 2 is in the hemisphere on cylinder style.

Figure 3:
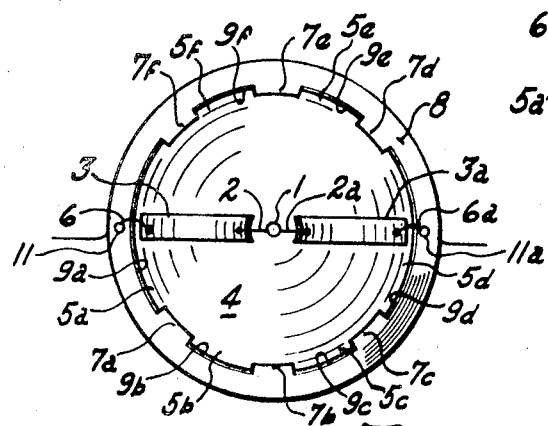
FIGURE 3 shows a plan view of FIGURE 1 and FIGURE 2.

FIGURE 3 shows a plan view which is applicable both to FIGURE 1 and FIGURE 2. It is to be noted that this invention significantly reduces the uncertainties of heat transfer between the bead thermistor mount and the environment. This in turn leads to reduced uncertainty in heat transfer between the head thermistor and the mount. The mount is in the form of a helmet or bonnet carrying a conventional thermistor type of sensor at the apex of the bonnet. Electrical connection to the telemetry transmitter is in the form of a pair of aluminum strips extending from the apex 8 "pole" of the bonnet to points on the bonnet's base.

It will be understood that certain features and sub-combinations are of utility and may be employed without reference to other features and sub-combinations.

Having thus described my invention, I claim:

1. Apparatus for mounting a thermistor in a rocketsonde having a telemetry transmitter comprising a geometric surface of revolution having a predetermined shape constructed from a thin film of Mylar, said geometric surface having an apex and a base, a thin layer of aluminum coating in the interior surface of said film of Mylar to reflect radiation from said apparatus, a thermistor positioned at the exterior of said apex, said thermistor having first and second electrical connections, first and second aluminum strips coated on the exterior of said Mylar, said first and second strips extending from said apex to points on said base with said first and second strips being connected to said first and second electrical connection, respectively, at said apex, a mounting plate for said Mylar, said mounting plate being positioned on said rocketsonde, means to ventilate the interior of said Mylar, said ventilating means being located at the junction of said Mylar and said mounting plate, and electrical means at said base to interconnect said first and second strips to said telemetry transmitter.

2. Apparatus for mounting a thermistor as described in claim 1, wherein said geometric surface of revolution is in the form of a paraboloid.

3. Apparatus for mounting a thermistor as described in claim 1, wherein said geometric surface of revolution is in the form of hemisphere.

4. An apparatus for mounting a thermistor as described in claim 1, wherein said geometric surface of revolution is in the form of a hemisphere on a cylinder.

References Cited

UNITED STATES PATENTS

| | | | |
|---|---|---|---|
| 2,931,897 | 4/1960 | Tuve et al. | 325—113 |
| 3,008,666 | 11/1961 | Kuck | 325—113 |
| 3,333,476 | 8/1967 | Hardy et al. | 73—362 |

MILTON BUCHLER, Primary Examiner

F. S. MIDDLETON, Assistant Examiner

U.S. Cl. X.R.

73—362; 147—68.5; 325—113, 115; 340—177; 343—708, 872